(12) United States Patent
Cha et al.

(10) Patent No.: US 12,489,393 B2
(45) Date of Patent: Dec. 2, 2025

(54) LIGHT SOURCE-TRACKING SOLAR CELL ARRAY, AND SOLAR POWER GENERATION SYSTEM USING SAME

(71) Applicant: KOREA ELECTROTECHNOLOGY RESEARCH INSTITUTE, Gyeongsangnam-do (KR)

(72) Inventors: Seung Il Cha, Seoul (KR); Min Ju Yun, Gyeongsangnam-do (KR); Yeon Hyang Sim, Gyeongsangnam-do (KR); Dong Yoon Lee, Gyeongsangnam-do (KR)

(73) Assignee: KOREA ELECTROTECHNOLOGY RESEARCH INSTITUTE, Gyeongsangnam-do (KR)

( * ) Notice: Subject to any disclaimer, the term of this patent is extended or adjusted under 35 U.S.C. 154(b) by 140 days.

(21) Appl. No.: 18/278,000

(22) PCT Filed: Feb. 5, 2021

(86) PCT No.: PCT/KR2021/001579
§ 371 (c)(1),
(2) Date: Aug. 20, 2023

(87) PCT Pub. No.: WO2022/102873
PCT Pub. Date: May 19, 2022

(65) Prior Publication Data
US 2024/0322745 A1    Sep. 26, 2024

(30) Foreign Application Priority Data

Nov. 12, 2020  (KR) .................. 10-2020-0151360

(51) Int. Cl.
*H02S 20/32* (2014.01)
*H02S 30/20* (2014.01)
(Continued)

(52) U.S. Cl.
CPC .............. *H02S 20/32* (2014.12); *H02S 30/20* (2014.12); *H10F 19/80* (2025.01); *H10F 19/904* (2025.01); *H10F 19/906* (2025.01)

(58) Field of Classification Search
CPC .............. H02S 30/20; H02S 20/00–20; H02S 20/22–24; H02S 20/30; H02S 20/32
See application file for complete search history.

(56) References Cited

U.S. PATENT DOCUMENTS

2010/0233843 A1* 9/2010 Frolov ............... H01L 31/0508
257/E31.119

FOREIGN PATENT DOCUMENTS

| CN | 108551302 A | * 9/2018 | ............. H02S 20/30 |
| CN | 110601653 A | * 12/2019 | ............. H02S 30/10 |
(Continued)

OTHER PUBLICATIONS

English machine translation of Han et al. (CN 108551302) published Sep. 18, 2018.*

(Continued)

*Primary Examiner* — Christina Chern
(74) *Attorney, Agent, or Firm* — JCIPRNET

(57) ABSTRACT

Proposed are a light source-tracking solar cell array, and a light source-tracking solar power generation system using same. More specifically, a light source-tracking solar cell array, and a light source-tracking solar power generation system using same, wherein light source-tracking solar cell array includes a stretchable solar module including a plurality of unit solar cells and a metal fiber-based conductive connector having elasticity and flexibility, wherein the plurality of unit solar cells are connected to each other by the conductive connector, and a transformable means which transforms in shape according to a change in position of a light source by connecting at least two or more of the (Continued)

plurality of unit solar cells, wherein the stretchable solar module is transformed in shape as the transformable means changes intervals between the unit solar cells due to the changes in the position of the sun.

12 Claims, 16 Drawing Sheets

(51) Int. Cl.
*H10F 19/80* (2025.01)
*H10F 19/90* (2025.01)

(56) References Cited

FOREIGN PATENT DOCUMENTS

| | | | | |
|---|---|---|---|---|
| JP | 2009044049 | 2/2009 | | |
| JP | 2013162011 | 8/2013 | | |
| KR | 1020130075937 | 7/2013 | | |
| KR | 20140021839 A | * 2/2014 | ................ | F24J 2/38 |
| KR | 101647566 | 8/2016 | | |
| KR | 101945916 | 2/2019 | | |
| KR | 102095782 | 5/2020 | | |

OTHER PUBLICATIONS

English machine translation of Wang et al. (CN 110601653) published Dec. 20, 2019.*
English machine translation of Lee et al. (KR 2014-0021839) published February 2014.*

* cited by examiner

LIGHT SOURCE-TRACKING SOLAR CELL ARRAY, AND SOLAR POWER GENERATION SYSTEM USING SAME

TECHNICAL FIELD

The present disclosure relates to a light source-tracking solar cell array, and a solar power generation system using the same.

BACKGROUND ART

Recently, energy consumption has increased significantly due to high industrial growth and population growth, and the resulting increase in greenhouse gases such as carbon dioxide has become a threat to the future of mankind. As a countermeasure, research and development of alternative energy are being actively carried out, and in South Korea, solar power generation systems are growing rapidly due to institutional support including renewable energy policies. In line with this trend, technology for generating energy by installing solar cells on the outermost part of structures such as the roof of a building or vehicle is developing. The problem is that, because of different designs of the structures, in order to install a typical flat-type solar cell, additional structures need to be installed or there are limitations on installation locations. In other words, the efficiency of solar cells decreases when the quantity of light is small or the light incident angle or curved surface changes.

However, solar cells or PV panels generally have a planar or two-dimensional shape to provide a larger cross-sectional area and to receive uniform incident light to prevent mismatch losses. In this regard, several recent studies show that two-dimensional (2D) or three-dimensional (3D) solar cell arrays with more complex cylindrical or fractal structures receive omnidirectional light and generate more electricity within a smaller installed area. That is, in solar power generation, it is important to utilize not only direct incident light but also omnidirectional light within a limited installed area.

In addition, since outdoor solar energy systems must achieve both high power production and high capacity in a limited installed area, a solar tracking system is required to maximize power output. In this regard, solar arrays are tracked the position of the sun by tilting, and flat modules are used to maximize the cross-sectional area, but such a tracking system is complicated and expensive while the flat modules cannot utilize omnidirectional incident light, which is problematic.

As an example of related art, "SOLAR-TRACKING TYPE SOLAR ENERGY GENERATION APPARATUS (Korean Patent No. 10-1647566)" discloses an apparatus provided with a solar-tracking unit that measures the amount of power generated from solar cells and is coupled to a solar cell array unit, and the position of the solar cell array unit is changed to face the direction of a solar cell that outputs the largest amount of power generation among a plurality of power generation amounts measured by the solar-tracking unit. However, as in the above-example, there is a problem of rising costs since an additional device such as a tracking unit is required in order to track the optimal solar path, as well as a problem of not being able to store energy to the maximum because space for rotation is needed in order to track the path and an electric current required for rotation is inevitably consumed.

Moreover, when solar cells are used in indoor spaces such as smart factories and living rooms at home, the solar cells do not face the incident light in a straight line or are installed in an uneven space, and thus, the light absorption efficiency decreases due to the difference in the quantity of light and the incidence angle. Against this backdrop, organic solar cells that are flexible and have high light transmittance have been developed. Like this, efforts are being made to expand the range of use of solar cells, such as in indoor environments and as power sources for mobile electronic devices, by making solar cells, which have been used outdoors or under sunny conditions, to work with artificial light sources of low light intensity including indoor fluorescent lamps.

Accordingly, the inventors of the present disclosure developed a stretchable solar module that may freely implement a two-dimensional or three-dimensional shape, and completed the present disclosure after confirming that the shape of a solar cell array may be transformed in response to an indoor or outdoor light source by attaching a transformable means to the surface of the solar cells constituting the solar module.

DISCLOSURE

Technical Problem

The present disclosure has been made keeping in mind the problems occurring in the related art. An objective of the present disclosure is to provide a light source-tracking solar cell array including a stretchable solar module and a transformable means which transforms in shape in response to the heat from a light source that varies according to a change in position of the sun, so that the shape of the solar module changes according to the change in the position of the sun.

In addition, an objective of the present disclosure is to provide a solar power generation system including the light source-tracking solar cell array.

Technical Solution

In order to achieve the above mentioned objectives, according to an aspect of the present disclosure, there is provided a stretchable solar module configured to include a plurality of unit solar cells and a metal fiber-based conductive connector having elasticity and flexibility, wherein the plurality of unit solar cells are connected to each other by the conductive connector; and a transformable means configured to transform in shape according to a change in position of the sun by connecting at least two or more of the plurality of unit solar cells, wherein a shape of the stretchable solar module may be deformed as the transformable means changes intervals between the plurality of unit solar cells due to a change in position of a light source.

In addition, in the present disclosure, the metal fiber-based conductive connector may be a connector made of metal fabric, and when connecting adjacent unit solar cells of the plurality of unit solar cells, the metal fabric may be connected to the adjacent unit solar cells in a state biased slantly to a direction in which the adjacent unit solar cells are connected, creating elasticity due to tension or contraction of the metal fabric connector.

In addition, in the present disclosure, each of the unit solar cells may include:

a substrate layer;

an insulator layer provided on top of the substrate layer;

a solar cell layer provided on top of the insulator layer and in which a solar cell is disposed; and an encapsulation material layer disposed while encapsulating an upper surface of the solar cell layer to protect the solar cell.

In addition, in the present disclosure, a fixing parts provided at an end of the solar module for position fixing may be further included.

In addition, in the present disclosure, the solar module may further include a support parts, wherein the support parts may be provided with an insertion groove for inserting the fixing parts.

In addition, in the present disclosure, the solar module may be any one of an arch, a dome, and a spherical shape.

In addition, according to another aspect of the present disclosure, there is provided a light source-tracking solar power generation system including the above-described light source-tracking solar cell array.

Advantageous Effects

The light source-tracking solar cell array of the present disclosure is configured to include a stretchable solar module and a transformable means whose shape can be reversibly changed by heat, wherein the transformable means transforms in shape according to the change in the position of the sun, so that the shape of the solar module having elasticity and flexibility can change, thereby exhibiting solar tracking performance.

Furthermore, the solar power generation system of the present disclosure exhibits, by using the shape-transformable solar cell array, excellent solar tracking performance due to stretchable characteristics of the solar module and the transformable means, and can significantly improve power production compared to conventional solar-tracking solar power generation systems or solar power generation systems using fixed solar cells.

DESCRIPTION OF NUMERALS

Figure 1:
FIG. 1 is a conceptual diagram of a solar cell array according to an embodiment of the present disclosure.
Figure 1:
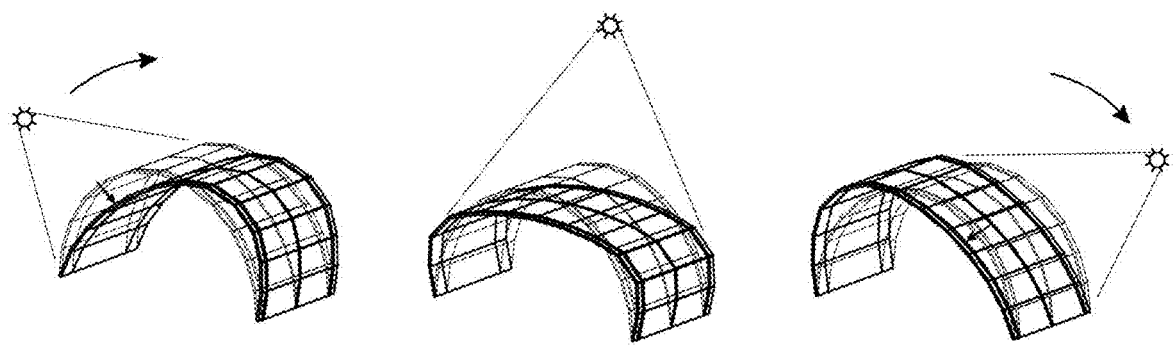
Figure 1:
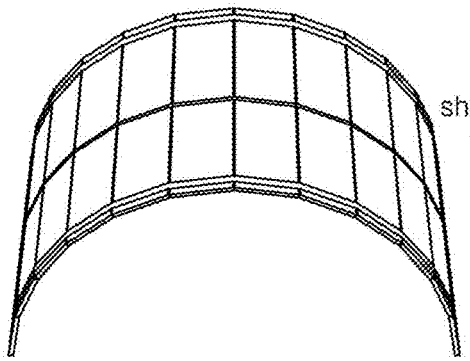
Figure 1:
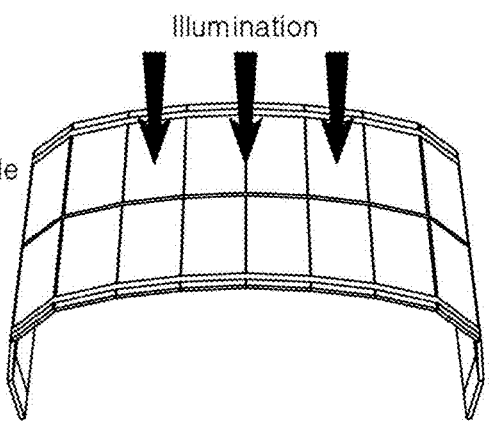

100: solar module
110: unit solar cell
111: solar cell layer
112: insulator layer
113: substrate layer
114: encapsulation material layer
120: conductive connector
121: electrode connection portion
122: joint portion
200: transformable means
300: connection means

MODE FOR INVENTION

Hereinafter, embodiments of the present disclosure will be described in detail with reference to the accompanying drawings. Meanwhile, in the drawings and detailed description, illustrations and references to configurations and actions that are easily understood by those skilled in the art, which belong to general solar cell technology, have been simplified or omitted. Particularly, in the illustration and detailed description of the drawings, detailed descriptions and drawings of the specific configuration and operation of elements not directly related to the technical features of the present disclosure are omitted, technical configurations and techniques related to the present disclosure have been briefly shown or described.

A light source-tracking solar cell array of the present disclosure is configured to include: a stretchable solar module including a plurality of unit solar cells; and a transformable means which transforms in shape in response to the heat from a light source according to a change in position of the light source, wherein the stretchable solar module is transformed in shape as the intervals between the unit solar cells are changed due to the change in position of the light source, enabling automated tracking of light sources. Accordingly, in the present disclosure, the shape of the solar module is changed to provide a larger cross-sectional area to the incident light source due to the stretchable characteristics of the solar module, thereby improving power production during solar power generation.

FIG. 1 is a conceptual diagram of a solar cell array according to an embodiment of the present disclosure. FIG. 1*a* shows the concept of automated solar tracking according to the change in the position of the sun when using a solar cell array for a day, and FIG. 1*b* shows a schematic diagram of a reversible shape change mechanism through heat transfer on the surface of a solar cell induced by sunlight.

As shown in 1*a*, the light source-tracking solar cell array of the present disclosure is characterized by being able to change the shape thereof, and is configured to maximize the cross-sectional area of the incident light by maintaining the surface of the solar cell perpendicular to incident sunlight as the solar cell array transforms in shape according to the position of the sun, which is a light source. In addition, as shown in 1*b*, when the surface temperature of the solar cell is increased by the sunlight as a light source, the transformable means s restored to a flat shape, and this flat shape maximizes the cross-sectional area to which sunlight is incident on the surface of the solar cell.

Figure 2:
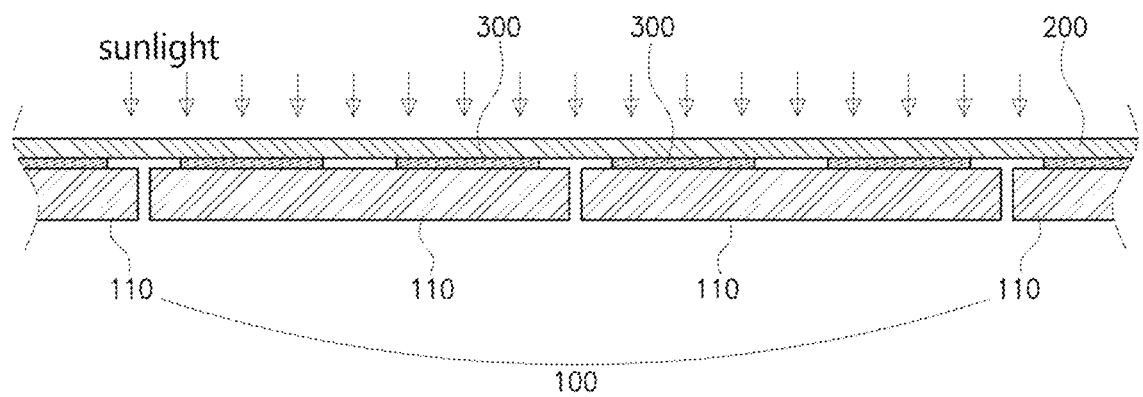
FIG. 2 is a side view of the solar cell array according to the embodiment of the present disclosure.

FIG. 2 is a side view of the solar cell array according to the embodiment of the present disclosure. The solar cell array is configured to include a stretchable solar module 100 and a transformable means 200.

To be specific, the light source-tracking solar cell array of the present disclosure includes the stretchable solar module 100 including a plurality of unit solar cells 110 and a metal fiber-based conductive connector 120 having elasticity and flexibility, wherein the plurality of unit solar cells 110 are connected to each other by the conductive connector 120; and the transformable means 200 which transforms in shape according to a change in position of a light source by connecting at least two or more of the plurality of unit solar cells 110.

At this time, as the transformable means changes the intervals between the unit solar cells according to the change in position of the light source, the shape of the stretchable solar module is deformed, enabling tracking of sunlight.

At this time, the stretchable solar module 100 includes the plurality of unit solar cells 110.

Figure 3:
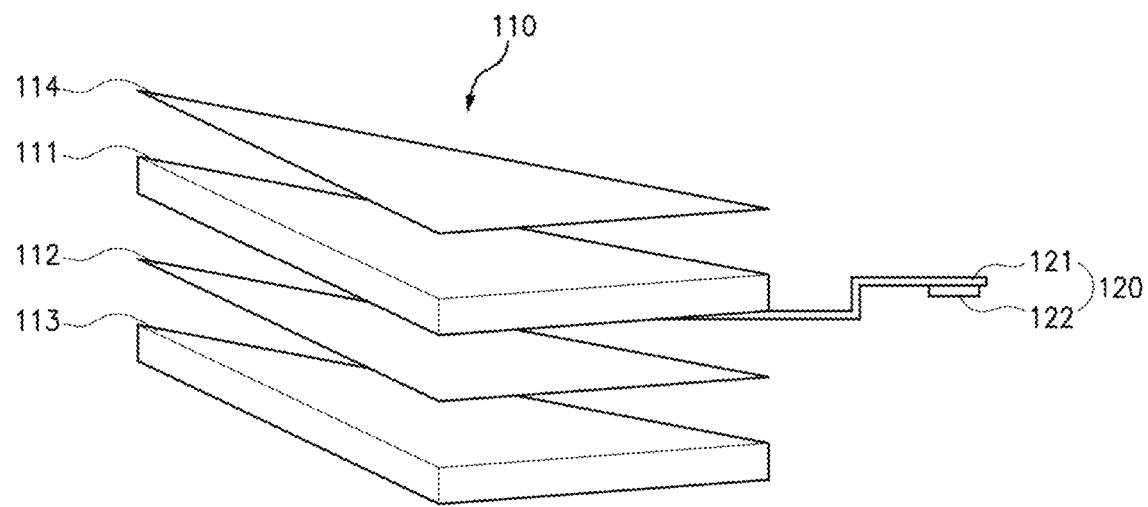
FIG. 3 is a side view of a unit solar cell in a stretchable solar module of the present disclosure.

FIG. 3 is a side view of a unit solar cell in a stretchable solar module of the present disclosure. Referring to this, the unit solar cell 110 includes: a substrate layer 113; an insulator layer 112 provided on top of the substrate layer 113; a solar cell layer 111 provided on top of the insulator layer and in which solar cells are disposed; and an encapsulation material layer 114 disposed while encapsulating the upper surface of the solar cell layer to protect the solar cell.

In addition, as an example, a metal substrate, a polymer substrate, etc., may be selected and used as the substrate layer by a person skilled in the art. Preferably, a stainless steel substrate may be used.

In addition, as the encapsulation material layer, two types of silicone rubber including polydimethylsiloxane (PDMS) may be used to replace the conventional EVA glass encapsulation material. This is because, conventionally, for encapsulation of a solar cell, back-sheet-EVA film-solar cell-EVA film-Glass was laminated and then thermally compressed to manufacture a solar cell module, but in this way, the solar cell cannot be folded or bent, making it impossible to manufacture a stretchable solar module. Accordingly, the encapsulation material in the present disclosure should be a material that does not penetrate moisture, protects the solar cell from external impact, and transmits light without loss at the same time, and should be a flexible material.

At this time, the encapsulation material layer 114 may be formed to encapsulate the entire back surface of the solar cell and the connector 120 with silicone rubber, and encapsulate the front surface of the solar cell module receiving the light with transparent PDMS.

In addition, since the connection position of the connector is important to ensure the flatness of the solar module, if a negative electrode and a positive electrode partially overlap, shear force is generated in a unit solar cell, which may damage the unit solar cell. Thus, in order for the adjacent unit solar cells to be connected, the negative electrode on the lower surface of the solar cell layer 111 of any one unit solar cell needs to be connected to an electrode connection portion 121, which is one end of the connector 120, while the electrode connection portion 121, which is the other end of the connector, needs to be connected to the positive electrode of the upper surface of the solar cell layer 111 of another unit solar cell. As described above, when connecting unit solar cells, a metal fabric with elasticity and flexibility is used, so that even if the positive electrode and negative electrode are located on the top and bottom of the solar cell layer, respectively, they may be flexibly connected. In this way, the connection of adjacent unit solar cells using the connector may be in series or parallel, and may be in series-parallel. At this time, when connecting the connector and the solar cell layer 111, a joint portion 122 may be formed by soldering, and the lower part of the solar cell layer 111 is configured to be insulated with the insulator layer 112 except for the joint portion 122.

In addition, the transformable means 200 connects the plurality of unit solar cells 110 by means of a connection means 300 to change the intervals between the unit solar cells 110 according to the change in the position of the light source. At this time, by connecting at least two or more of the plurality of unit solar cells 110, the intervals between the unit solar cells 110 are controlled, and thus the shape of the solar module 100 is deformed, thereby enabling light source tracking.

In addition, the transformable means 200 is formed to be a shape capable of connecting the unit solar cell 110, and refers to those whose shape may be reversibly changed by heat, such as an elastic material, wire, cylinder, rubber, metal, ceramic, polymer, etc.

As a preferred example, the transformable means may be made of a shape-memory alloy.

At this time, the shape-memory alloy refers to an alloy that has the property of returning to its original, pre-deformed shape by heat even if it is deformed into a different shape, and refers to all alloys having shape restoring ability other than Ni—Ti-based and Cu—Zn—Ti-based alloys. In the preferred embodiment of the present disclosure, an alloy whose shape changes at 38 to 45° C. is used.

In addition, depending on the case, it is possible to use a combination of transformable means made of different materials. For example, in areas with distinct seasonal changes, since the characteristics of shape memory alloys may not be exhibited in a low temperature environment, by installing a heating material or a heat generating device in an adjacent area, a shape-memory alloy may be deformed without being greatly affected by the surrounding environment.

Alternatively, it is also possible to change the shape of the solar module by using a shape-memory alloy and a wire together to provide a drive means by stretching or tensioning the wire according to the change in the altitude of the sun.

As a preferred embodiment of the present disclosure, FIG. 4 shows a test result for the temperature of the surface of a solar cell and a shape-memory alloy attached to the solar cell.

Figure 4A:
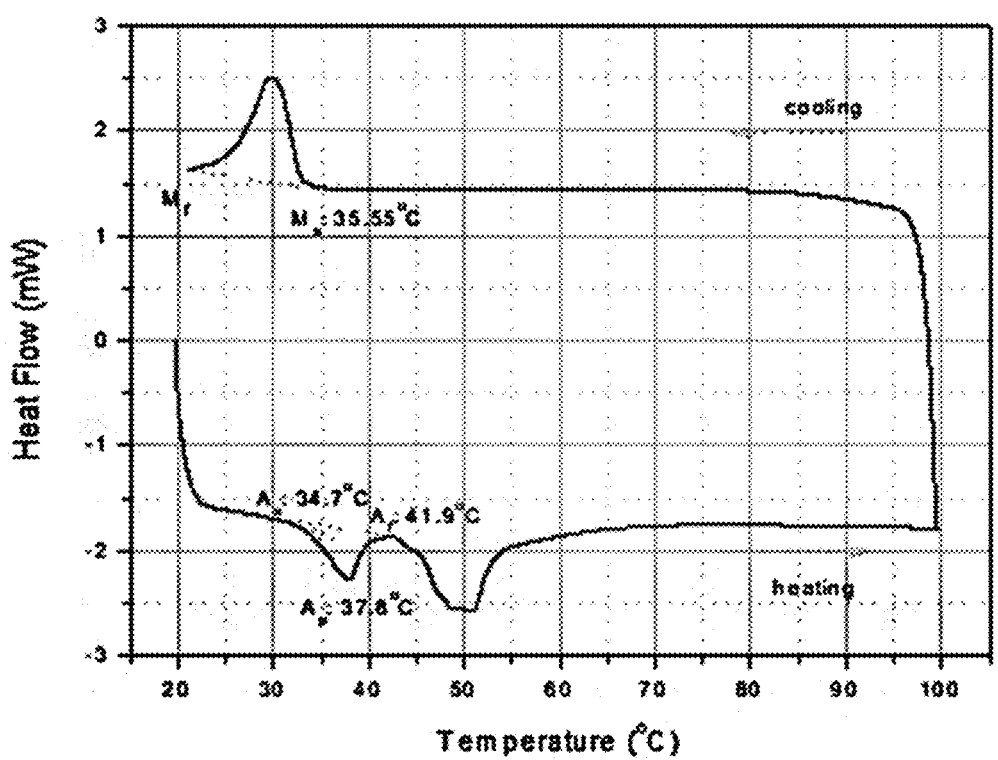
FIG. 4*a*-FIG. 4*d* shows a test result for temperatures of the surface of a solar cell and a shape-memory alloy attached to the solar cell.

To be specific, FIG. 4a shows the results of differential scanning calorimetry (DSC) analysis of a shape-memory alloy as indicated, and in the DSC analysis, a NiTi shape-memory alloy whose austenitic phase transition starts at 34.7° C. (As) and ends at 41.9° C. (Af) was used. As shown in FIG. 4(a), since the martensitic phase transition starts at 35.5° C. (Ms) during cooling, at temperatures below 34.7° C., the shape-memory alloy is in the relatively flexible martensitic phase, and above this temperature, the alloy hardens and returns to its memorized shape, and this phase transition ends at 41.9° C. upon heating. That is, when cooled below the Ms temperature, the alloy returns to its original free deformation state.

Figure 4B:
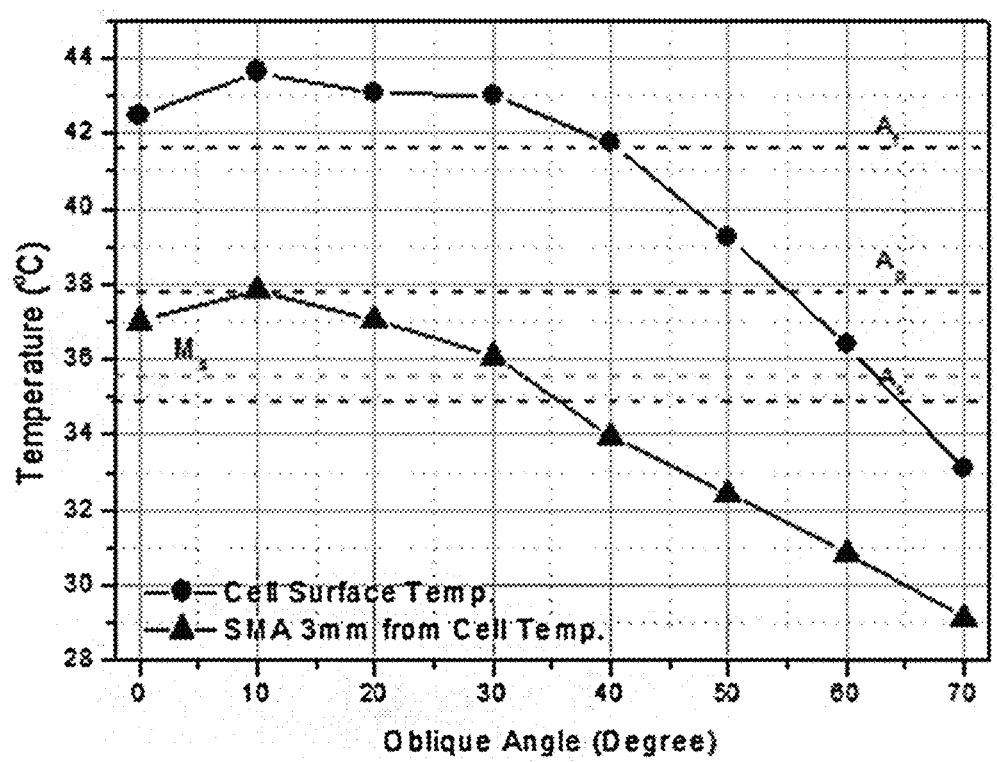

In addition, FIG. 4b shows the temperatures of the surface of a solar cell and a shape-memory alloy attached to the solar cell. Referring to FIG. 4b, the temperature of a passivated emitter rear cell (PERC) type crystalline Si solar cell differs from angles of incidence (AOI) under the lighting conditions of one sun and 1.5 A.M.

Figure 4C:
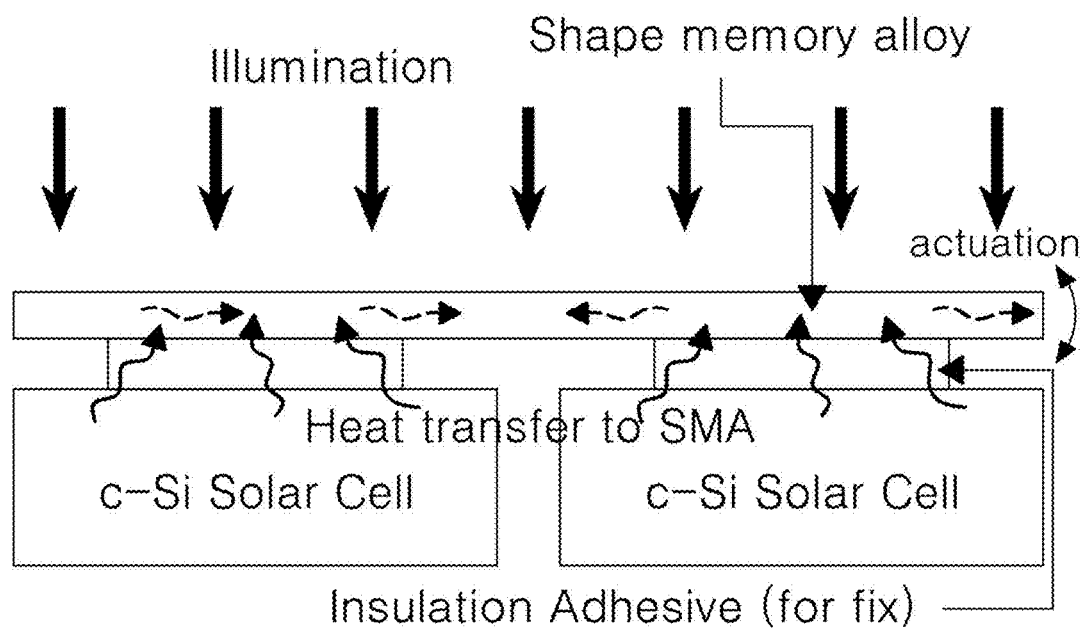
Figure 4C:
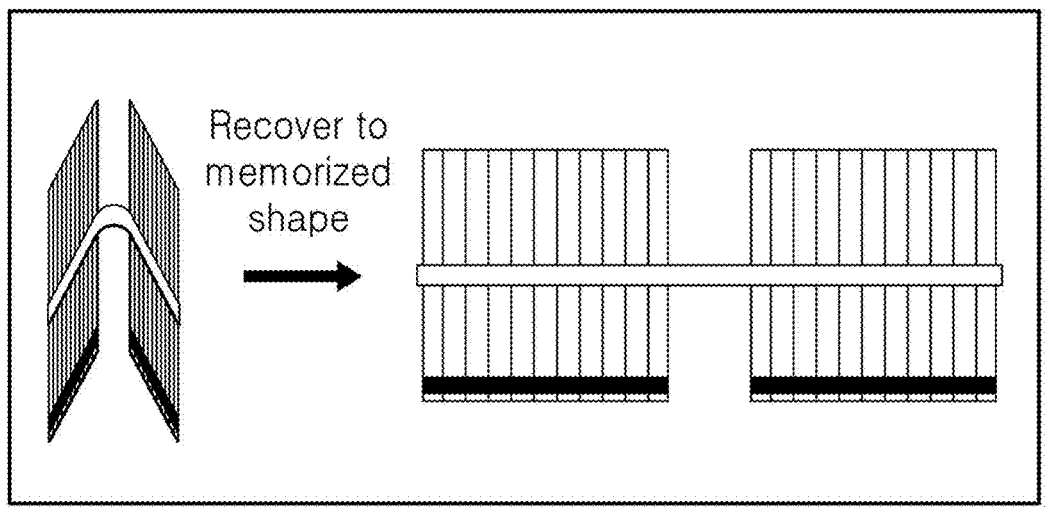

FIG. 4c shows a schematic diagram of a heat transfer process and shape-memory alloy actuation. Referring to FIG. 4c, in a solar module, the shape change of a solar cell array is induced by an actuation of a shape-memory alloy component connecting unit solar cells. Thus, the temperature of a shape-memory alloy component is more important than the temperature of the unit solar cell surface itself. The temperature of the shape-memory alloy component located 3 mm from the surface of the solar cell and between the unit solar cell and a connection backbone follows a similar trend to that of the solar cell surface, but the temperature is 2-6° C. lower. Thus, an incident angle of less than 30° C. may provide a temperature sufficient for phase transition, and at this temperature, the deformed shape-memory alloy returns to its original memorized planar shape.

Figure 4D:
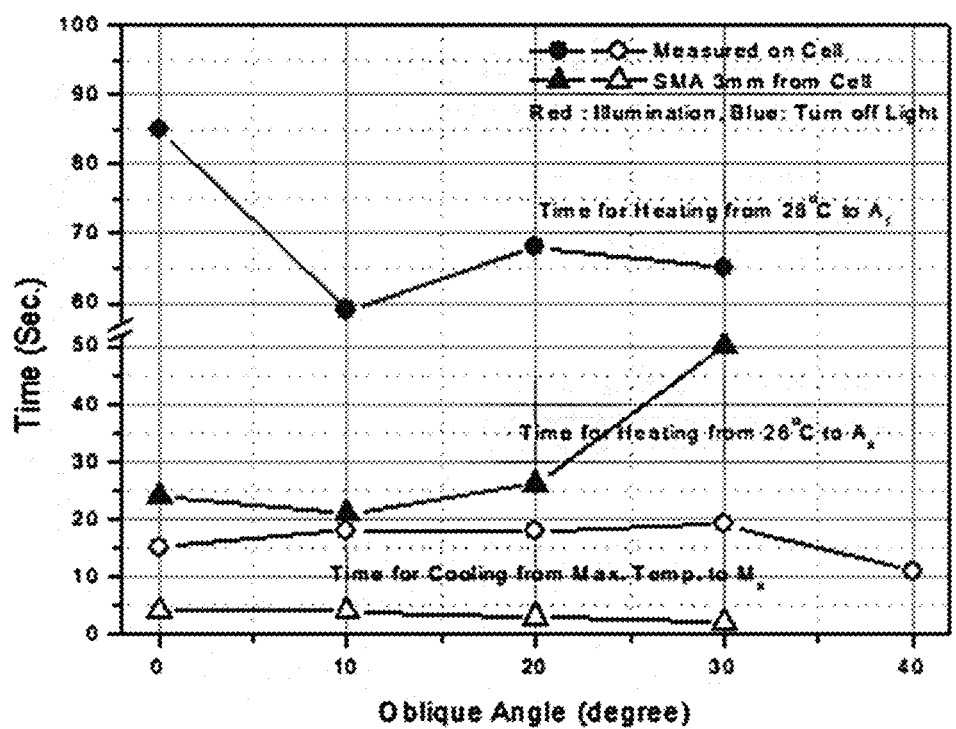

FIGS. 4d and 4e show heating and cooling time of the surface of the solar cell and the shape-memory alloy according to incident angles under illumination and non-illumination conditions after connecting two unit solar cells with the shape-memory alloy. The angle-of-incidence dependence of temperature provides an important characteristic for solar tracking. When the vertical direction is weak and the angle of incidence is low, the shape-memory alloy starts to straighten, and this effect spreads to an alloy attached to an adjacent cell, making more parts of the solar cell array are aligned perpendicular to the arrangement of solar cells. The speed of temperature change is also important in order to respond to the requirement for continuous motion and continuous shape change of the light source, the sun.

As shown in FIG. 4d, for the alloy, the time taken from room temperature to As is less than 1 minute, and the time is reduced to less than 30 seconds when the angle of incidence is less than 20 degrees. Considering the moving speed of the sun as a light source, this heating rate is sufficient for tracking the sun. In addition, since it takes less than 20 seconds to cool to the original temperature under zero light, a shape restored part of the shape-memory alloy does not interfere with the shape deformation of the entire solar cell. Referring to FIG. 4e showing the temperature change according to the stepwise change of the incident angle, when the angle of incidence increases by 10° C., the temperature drops rapidly, and the rate of temperature change may be ascertained.

Figure 5:
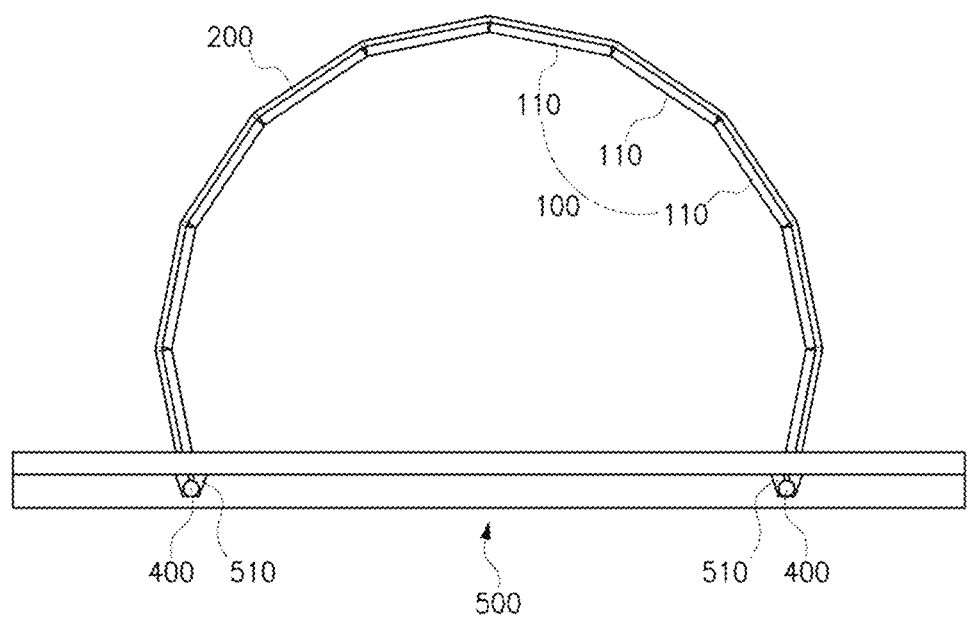
FIG. 5 is a side view of the solar cell array according to the embodiment of the present disclosure.
Figure 6:
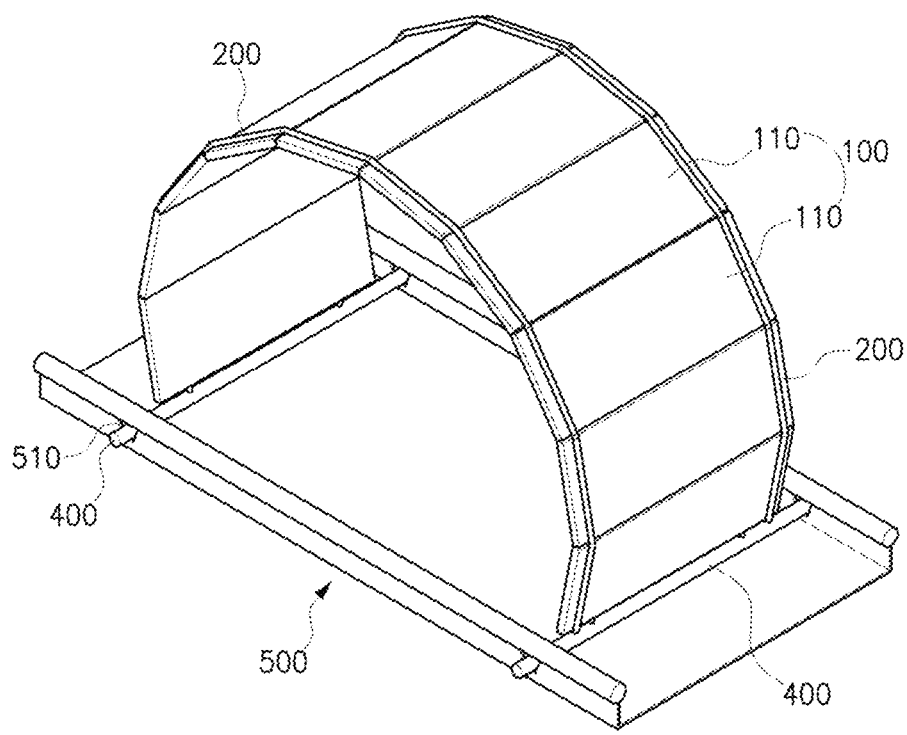
FIG. 6 is a perspective view of the solar cell array according to the embodiment of the present disclosure.

FIG. 5 is a side view of the solar cell array according to the embodiment of the present disclosure, and FIG. 6 is a perspective view of the solar cell array according to the embodiment of the present disclosure.

Referring to FIGS. 5 and 6, the solar cell array of the present disclosure may include: a fixing parts 400 installed at the end of the stretchable solar module 100 to fix the solar module 100.

As an example, the fixing parts 400 may be a shaft, but is not limited thereto.

In addition, the solar cell array may include: a support parts 500 installed in the space on one side of the solar module 100, and in the support parts 500, an insertion groove 510 into which the fixing parts 400 may be inserted may be further included.

The support parts 500 occupies a certain area or space, and enables the solar cell array to be fixed on the ground, on the side, or on a certain space. The insertion groove 510 is included as a part of the support parts 500, and may affect the curvature or shape of the photovoltaic module 100 according to the formation position of the supporting means 500.

At this time, the fixing parts 400 according to this embodiment is inserted into the insertion groove 510 of the support parts 500 and rotated, so that the fixing parts 400 does not interfere with the relatively free transformation in shape of the solar module 100.

In addition, since the shape of the solar module is deformed by the transformable means 200 according to the change in the position of the sun, which is the light source, and the solar cell array tracks the position of the sun, when there is no sun, the transformable means should be re stored to its original state. Thus, in the solar cell array, an elastic means may be further attached as a backbone to the lower surface of the unit solar cell of the solar module 100. In this case, as the shape transformation of the transformable means induced by the change in temperature due to the change in the position of the sun is restored and the force is applied in the direction of recovering the shape, tension of the elastic means is added to the stretchable solar module, so that the stretchable solar module may be easily restored to its original shape.

In addition, the stretchable solar module 100 of the embodiment of the present disclosure includes a plurality of unit solar cells and a metal fiber-based conductive connector having elasticity and flexibility, wherein the plurality of unit solar cells are connected to each other by the conductive connector.

In addition, the stretchable solar module may implement various shapes as adjacent unit solar cells are interconnected by the metal fiber-based connector having elasticity and flexibility.

Preferably, the metal fiber-based connector is a connector made of metal fabric, and when interconnecting the adjacent unit solar cells 110, the metal fabric is connected to the adjacent unit solar cells in a state biased slantly to a direction in which the adjacent unit solar cells are connected, creating elasticity due to tension or contraction of the metal fabric connector. In addition, preferably, when the adjacent unit solar cells are interconnected, flexible folding due to the tension or contraction of the metal fabric connector is possible.

Therefore, in the stretchable solar module, adjacent unit solar cells are flexibly interconnected in various shapes by the tension or contraction of the metal fabric connector.

At this time, when the unit solar cell is formed in a polygonal shape such as a triangle, a quadrangle or a hexagon, it is also possible for the solar module to form a tessellation structure as the solar module is folded or stretched by such a flexible shape change.

In addition, the stretchable solar module 100 may implement various shapes as adjacent unit solar cells 110 are interconnected by the metal fiber-based connector having elasticity and flexibility. As the transformable means 200 transforms in shape by connecting at least two or more of the unit solar cells 110, and an interval between the unit solar cells 110 is increases or decreases by the conductive connector having elasticity and flexibility, the interval between the unit solar cells 110 is changed.

That is, the light source-tracking solar cell array of the present disclosure is configured to include the stretchable solar module 100 and the transformable means 200 whose shape may be reversibly changed by heat, so that the transformable means 200 transforms in shape according to the change in the position of the light source, and as a result, the shape of the solar module having elasticity and flexibility may be deformed, thereby enabling solar tracking performance.

Figure 7A:
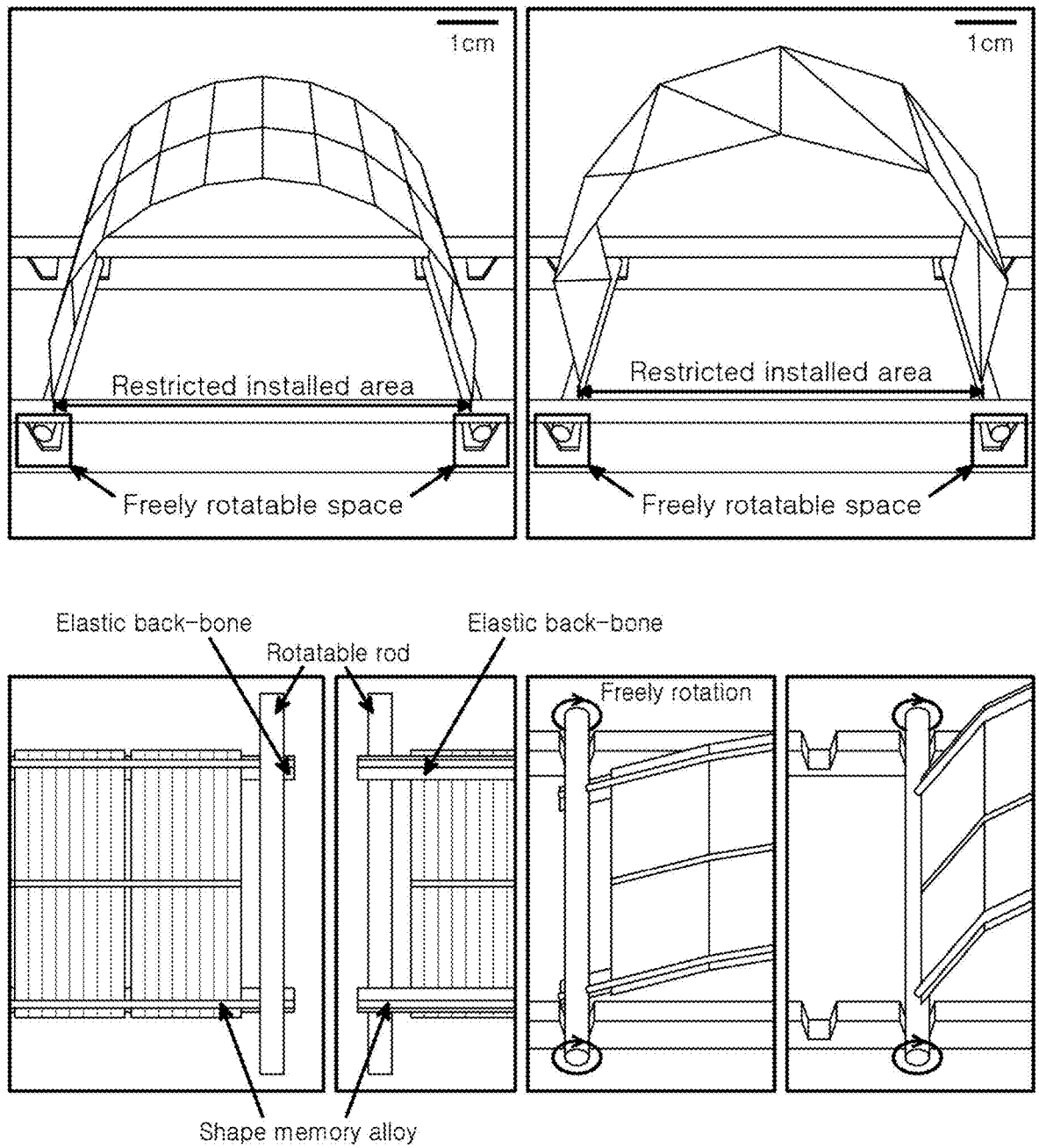
FIG. 7*a* shows a solar cell array including a solar module including a rectangular and right-angled triangle-shaped unit solar cells.
Figure 7B:
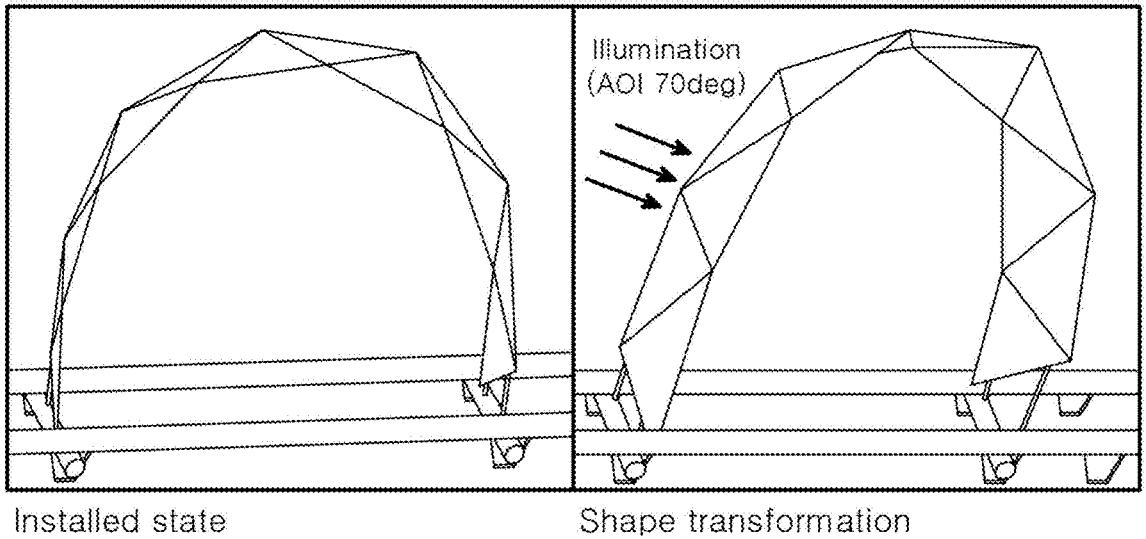
FIG. 7*b* shows a shape-changed solar cell array at an incident angle of 70°.
Figure 7B:
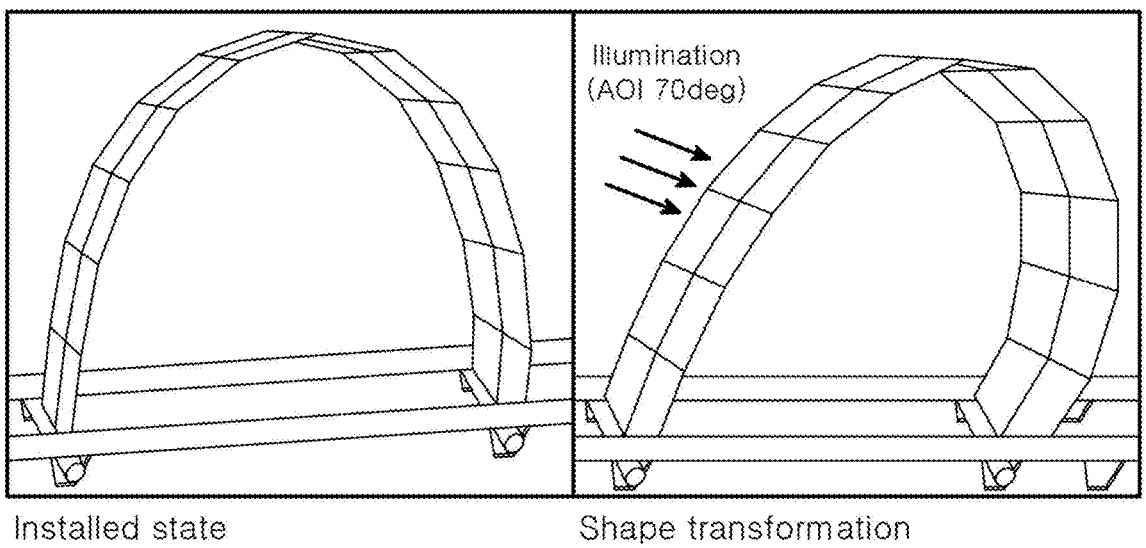

As a preferred embodiment of the present disclosure, FIG. 7a shows a solar cell array including a solar module including a rectangular and right-angled triangle-shaped unit solar cells, and FIG. 7b shows a shape-changed solar cell array at an incident angle of 70°.

To be specific, as shown in FIG. 7a, a soft elastic backbone such as silicone rubber or copper mesh is placed under the solar module, and the shape-memory alloy component is attached to the surface of the solar cell. To be specific, each end of the solar cell array is allowed to rotate freely while being constrained in transverse or vertical displacement to remain within a limited area.

At this time, as shown in FIG. 7a, it can be seen that the shape of the arched solar cell array has changed in response to the incident angle of 70°.

In this way, when the elastic backbone is attached to the lower surface of the unit solar cell, and the solar cell array is supported and fixed so that the shape of the solar cell array may be deformed while being remained within a limited area, the shape of the solar cell array may be reversibly deformed in response to the change in the position of the light source.

In other words, when a part of the solar cell array is heated by incident light in a limited area and the heat is transferred to the shape-memory alloy component, a heated part straightens and the array rotates freely clockwise. On the other hand, when the incident light is removed, the array rotates freely counterclockwise, and the original arch shape is restored by the elasticity of the backbone.

In addition, arrays may be changed to a variety of shapes by utilizing such free rotation, etc. in a limited area. Thus, the solar module 100 of the present disclosure may have any one shape of an arch, a dome, or a sphere. When the solar module 100 has a curvature shape, the shape of the transformable means 200 may be changed according to the position of the sun, and accordingly, the intervals between unit solar cells may be relatively easily changed.

Particularly, when the solar module 100 has a spherical shape, any one unit solar cell 110, which will be a standard, is regarded as an end and connected to the fixing parts 400 to be inserted into the groove of the support parts 500. Such a sphere-shaped solar array may be installed at a certain distance from a side, and this includes situations, such as a snowfield, sea, or river, where energy reflected from a side may be used to supply energy to a solar cell.

Figure 8A:
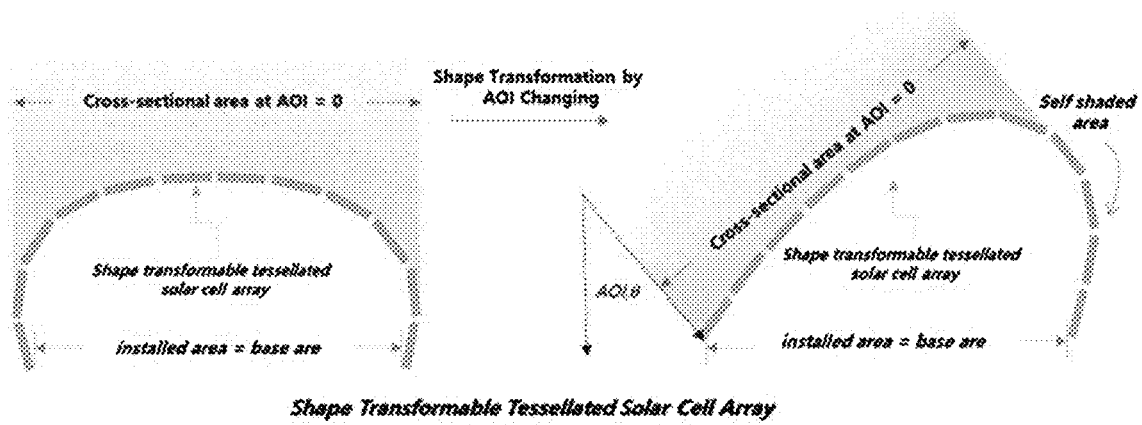
FIG. 8*a* shows the incident area according to the shape change of the arch-shaped solar cell array.

In addition, since the light source tracking performance may be calculated from the geometry of the solar cell array and the incident angle of the light source, as a preferred example, FIG. 8a shows the incident area according to the shape change of the arch-shaped solar cell array. When the arch shape is high and short, the relative cross-sectional area of the incident beam to the installed area is greater than that of the perfect tracking case until the AOI reaches 60 degrees. As the arch width increases and the height decreases, the relative cross-sectional area approaches that of a flat fixed case, as expected from geometrical changes. The result suggests that, even with a simple arch shape, a shape-transformable solar cell array may exhibit more effective sun-tracking performance than the perfect tracking case.

Figure 8B:
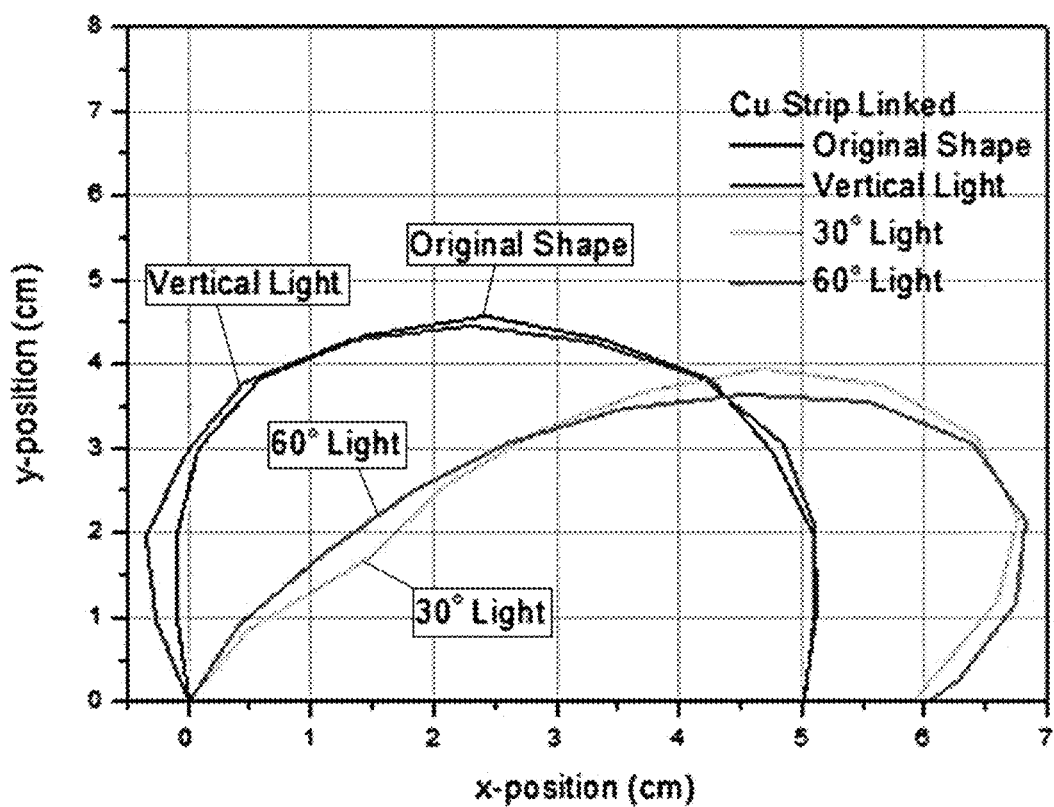
FIG. 8*b* shows an actual arc shape of the solar cell array obtained from the measured angle of incidence.

In addition, as a preferred example, FIG. 8b shows the actual arch shape of the solar cell array obtained from the measured angle of incidence. Referring to FIG. 8b, the surface area is larger than the installed area. For the incident beam, as designed and expected, an illuminated part of the array is straightened to push the opposite side, leading to a larger light receiving area. Even under vertical lighting, it can be seen that the installed area is exceeded as the middle part of the array straightens and the overall shape widens, pressing the arch to receive more light, which means that power production may be improved.

Accordingly, as another aspect, the present disclosure may provide a solar power generation system including a light source-tracking solar cell array. To be specific, the solar power generation system includes a light source-tracking solar cell array capable of shape change in consideration of light intensity and incident angle based on a place where the array is installed.

Figure 9A:
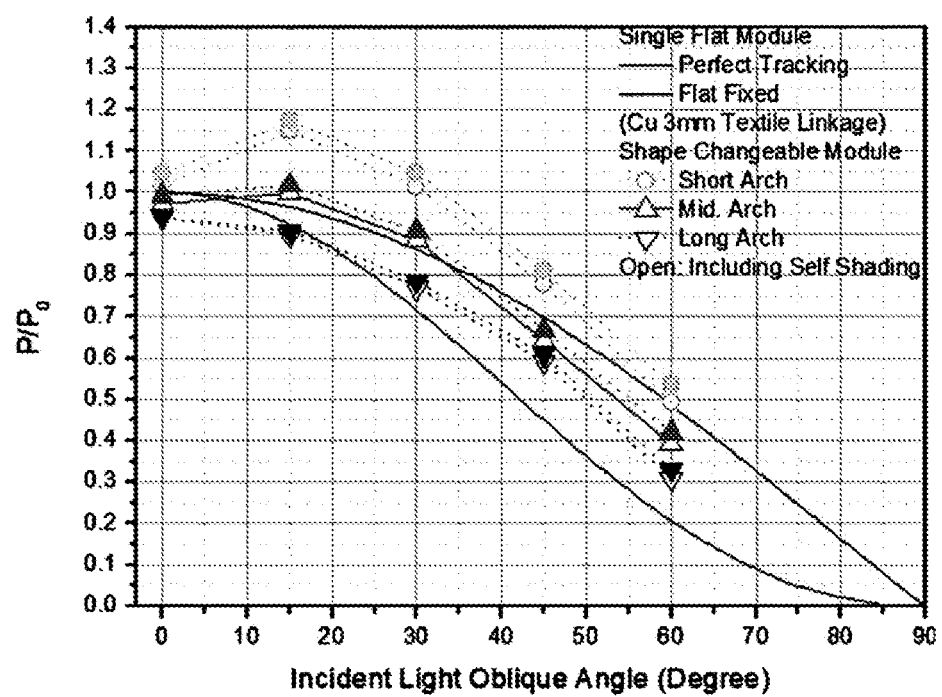
FIG. 9*a* and FIG. 9*b* show simulated power production results comparing a perfect tracking system and a transformed arch-shaped shape change solar cell array according to incident angles and intervals between modules.
Figure 9B:
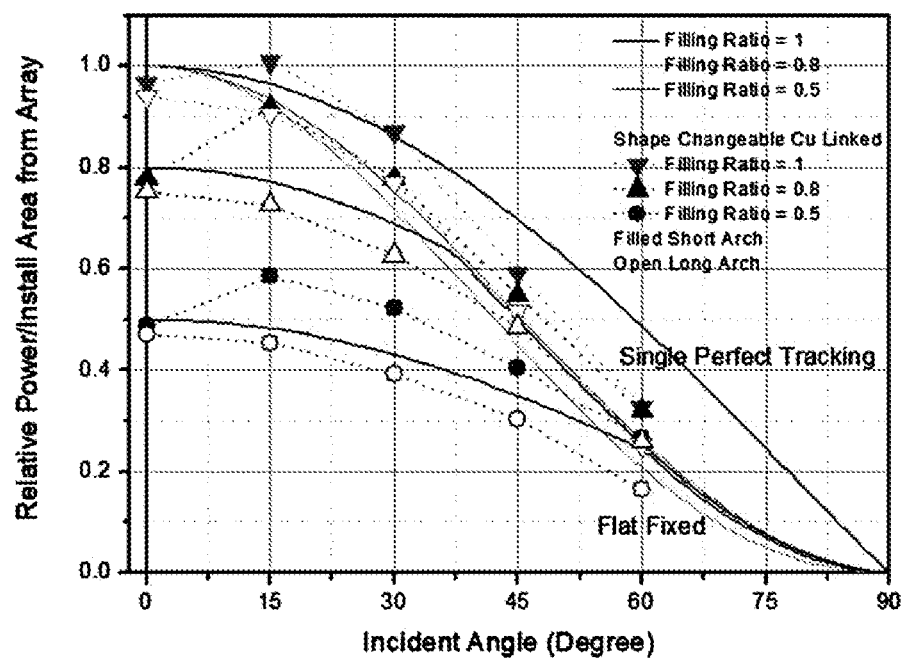

FIG. 9a and FIG. 9b show simulated power production results comparing a perfect tracking system and a deformed arch-shaped shape-transformable solar cell array according to incident angles and intervals between modules.

Referring to FIG. 9a, it was found that the expected power output of the shape-transformable solar cell array with a short and high arch structure exceeds that of the perfectly traced, fixed planar case. This means that the shape-transformable solar cell array of the present disclosure does not require additional energy or machinery and may be installed in a limited space anywhere in indoor or outdoor environments.

In addition, referring to FIG. 9b, the shape-deformable solar cell array of the present disclosure may perform better than the perfect tracking system. This means that power improvement may be further increased by considering scattered light incident on an installed area.

That is, when there are many modules installed, performance may be limited during light tracing due to mutual shading between modules. Thus, when the intervals between the modules are not sufficient, the shaded modules cannot operate at full capacity, and the power generation system presents significant limitations in light source tracking. The solar power generation system of the present disclosure may solve this problem and show improved performance by reducing the shadow area using a shape-transformable solar cell array.

As such, the solar power generation system of the present disclosure is expected to provide excellent performance by being applied not only to outdoor urban and plant applications, but also to indoors with low illumination.

Figure 10A:
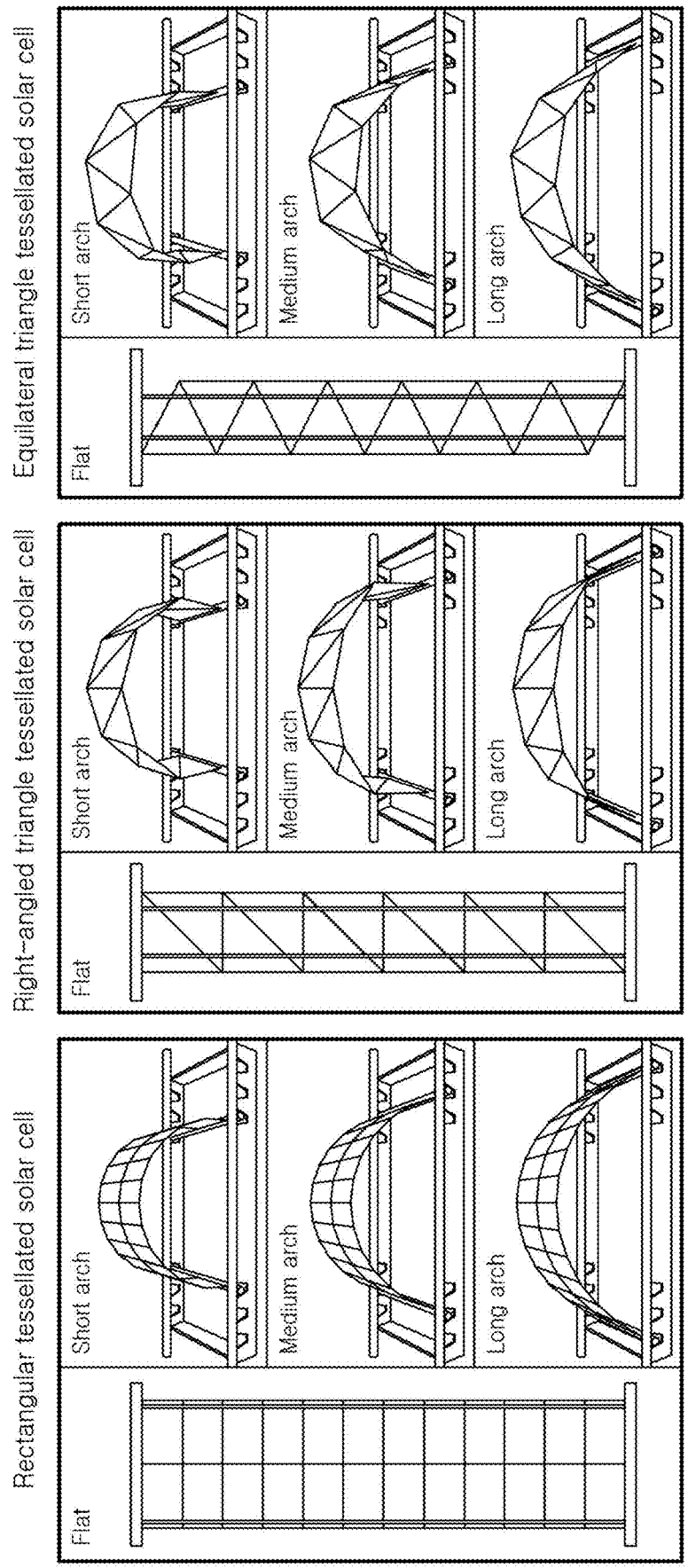
FIG. 10*a* shows a solar cell array including solar modules tessellated using rectangular, right-angled, and equilateral triangular unit solar cells.
Figure 10B:
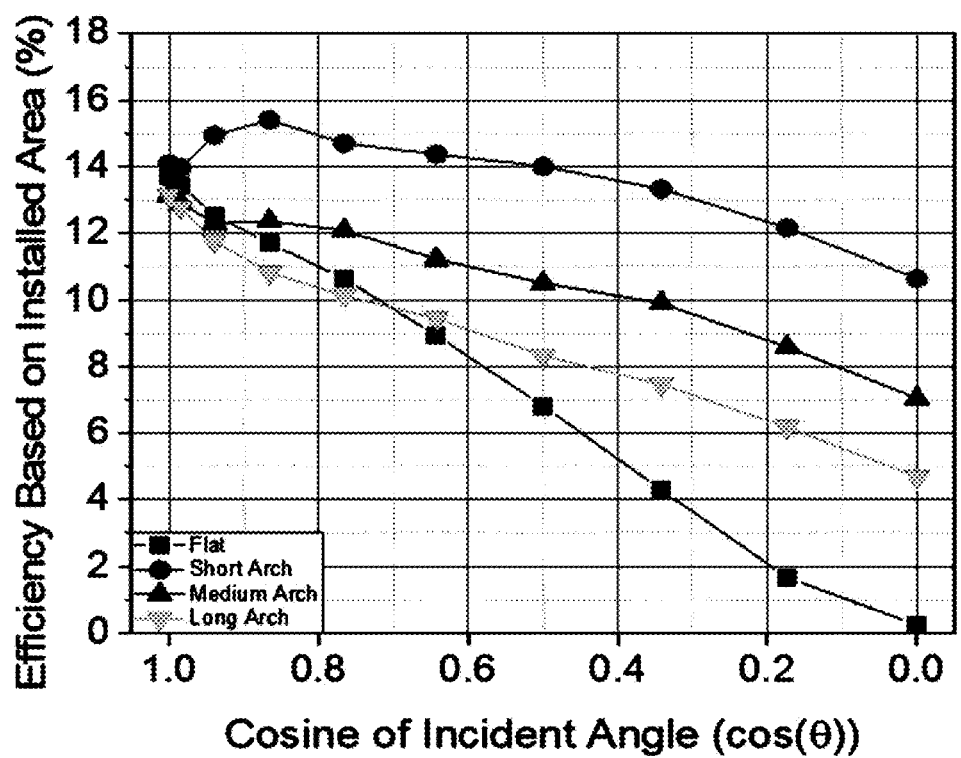
FIG. 10*b* shows an efficiency based on installed area of a solar cell array having rectangular unit solar cells.

In addition, as a preferred example, FIG. 10a shows photos of solar cell arrays including solar modules tessellated using rectangular, right-angled, and equilateral triangular unit solar cells, as flat and various arch-shaped solar cell arrays in a limited area; FIG. 10b shows an efficiency based on installed area of a solar cell array having rectangular unit solar cells; and FIG. 10c shows the accumulated power for a day of a solar cell array having rectangular unit solar cells.

Figure 10C:
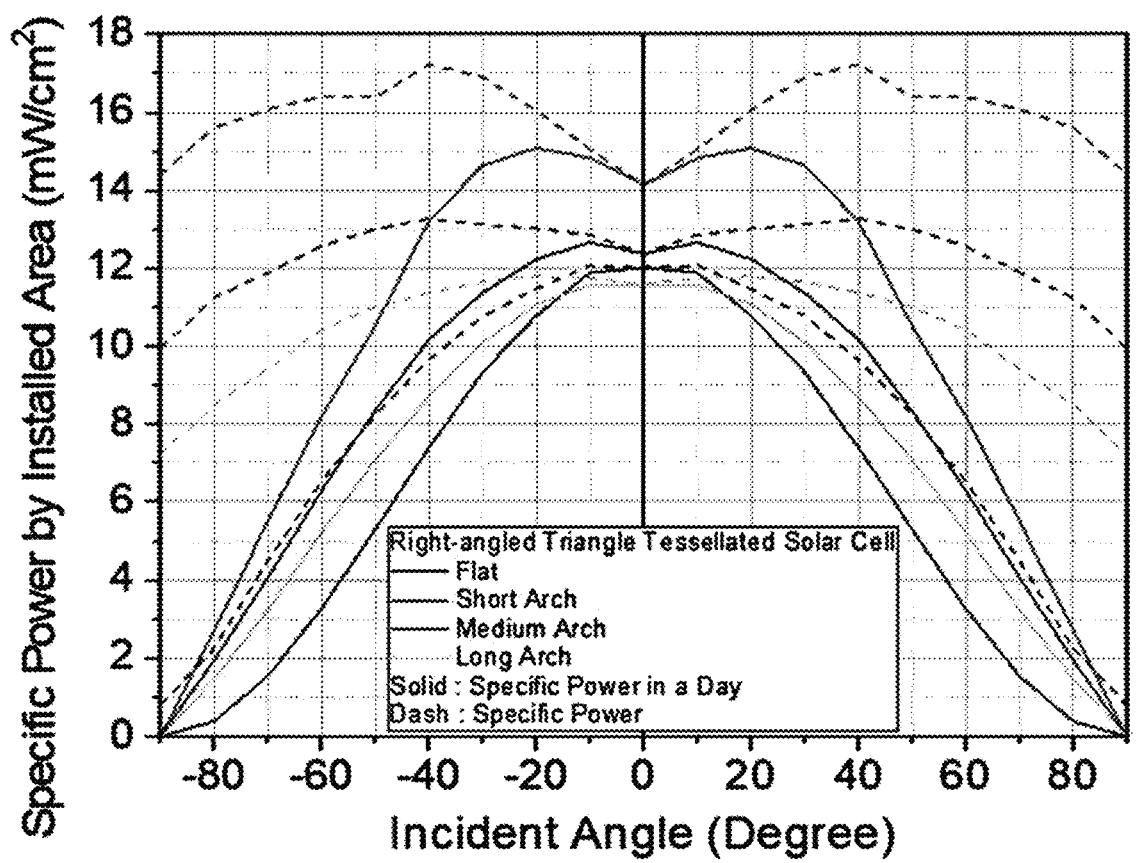
FIG. 10*c* shows the accumulated power for a day of a solar cell array having rectangular unit solar cells.

Referring to FIGS. 10a, 10b, and 10c, it has been shown that efficiency based on installed area may be improved through shape-transformable light source-tracking in all cases. In particular, the high and narrow arch showed excellent light-tracking performance, resulting in higher efficiency in a given installed area, with little effect of the angle of incidence on electricity production. In addition, regarding the installed area, the efficiency of shape-transformable solar cell array makes it possible to provide superior omnidirectional performance compared to a flat, fixed solar array.

In order to consider the actual daily electricity production, the cosine law of AOI related to solar lighting was applied to power production according to the angle of incidence.

Power versus installed area decreased due to the reduced light intensity as the incident angle increased. However, the power generated by the shape-transformable solar cell array was found to be greater than that of the flat, fixed solar cell at all angles of incidence.

The electricity production of a shape-transformable solar cell array composed of right-angled triangular units, considering the effect of light intensity changes due to changes in angle of incidence that more closely represent actual solar lighting conditions, was found to be 60% higher than that of a planar fixed solar cell array.

As such, the solar power generation system of the present disclosure may improve electricity production beyond what is possible with perfectly tracked flat solar panels by using a shape-transformable solar cell array. That is, a double-sided solar module may implemented as the system shows excellent light source tracking performance due to the stretchable characteristics of the solar module and the transformable means, and in the solar power generation system, this excellent solar tracking performance improves power generation compared to conventional solar tracking solar power systems or solar power systems with fixed solar cells.

Therefore, according to the system of the present disclosure capable of tracking the position change of the light source indoors or outdoors, more power may be produced, and it is expected that, by using solar modules of various designs, three-dimensional structures such as domes that are suitable for specific applications or that meet aesthetic requirements may be manufactured.

The above description is only illustrative of the technical idea of the present disclosure, those skilled in the art may variously modify and change the present disclosure without departing from the essential characteristics of the present disclosure. Therefore, the embodiments disclosed in the present disclosure are intended to explain rather than limit the technical idea of the present disclosure, and the scope of the technical idea of the present disclosure is not limited by these embodiments. The protection scope of the present disclosure should be interpreted by the claims, and all technical ideas within the equivalent range should be construed as being included in the scope of the present disclosure.

The invention claimed is:

1. A light source-tracking solar cell array, comprising:
a stretchable solar module configured to include a plurality of unit solar cells and a metal fiber-based conductive connector having elasticity and flexibility, wherein the plurality of unit solar cells are connected to each other by the conductive connector; and
a transformable means connected to the plurality of unit solar cells and configured to transform in shape in response to heat from the sun according to a change in position of the sun,
wherein a shape of the stretchable solar module is deformed as the transformable means changes intervals between the plurality of unit solar cells due to the change in position of the sun.

2. The light source-tracking solar cell array of claim 1, wherein the metal fiber-based conductive connector is a connector made of metal fabric, and when connecting adjacent unit solar cells of the plurality of unit solar cells, the metal fabric is connected to the adjacent unit solar cells in a state biased slantly to a direction in which the adjacent unit solar cells are connected, creating elasticity due to tension or contraction of the metal fabric connector.

3. The light source-tracking solar cell array of claim 1, wherein each of the unit solar cells comprises:
a substrate layer;
an insulator layer provided on top of the substrate layer;
a solar cell layer provided on top of the insulator layer and in which a solar cell is disposed; and
an encapsulation material layer disposed while encapsulating an upper surface of the solar cell layer to protect the solar cell.

4. The light source-tracking solar cell array of claim 1, further comprising:
a fixing part provided at an end of the solar module for position fixing.

5. The light source-tracking solar cell array of claim 4, wherein the solar module further includes a support part,
wherein the support part is provided with an insertion groove for inserting the fixing part.

6. The light source-tracking solar cell array of claim 1, wherein the solar module is any one of an arch, a dome, and a spherical shape.

7. A light source-tracking solar power generation system comprising the light source-tracking solar cell array of claim 1.

8. A light source-tracking solar power generation system comprising the light source-tracking solar cell array of claim 2.

9. A light source-tracking solar power generation system comprising the light source-tracking solar cell array of claim 3.

10. A light source-tracking solar power generation system comprising the light source-tracking solar cell array of claim 4.

11. A light source-tracking solar power generation system comprising the light source-tracking solar cell array of claim 5.

12. A light source-tracking solar power generation system comprising the light source-tracking solar cell array of claim 6.

* * * * *